(12) United States Patent
Lazerson

(10) Patent No.: US 8,626,645 B1
(45) Date of Patent: Jan. 7, 2014

(54) SYSTEM AND METHOD FOR ASSESSING MORTGAGE BROKER AND LENDER COMPLIANCE

(75) Inventor: Jeffrey M. Lazerson, Laguna Niguel, CA (US)

(73) Assignee: Mortagage Grader, Inc., Laguna Niguel, CA (US)

( * ) Notice: Subject to any disclaimer, the term of this patent is extended or adjusted under 35 U.S.C. 154(b) by 758 days.

(21) Appl. No.: 12/687,834

(22) Filed: Jan. 14, 2010

Related U.S. Application Data

(63) Continuation-in-part of application No. 12/484,031, filed on Jun. 12, 2009.

(60) Provisional application No. 61/077,424, filed on Jul. 1, 2008.

(51) Int. Cl.
*G06Q 40/00* (2012.01)
(52) U.S. Cl.
USPC ............................................. 705/38; 705/35
(58) Field of Classification Search
USPC ................................................ 705/38, 35, 10
See application file for complete search history.

(56) References Cited

U.S. PATENT DOCUMENTS

| | | | | |
|---|---|---|---|---|
| 6,105,007 | A * | 8/2000 | Norris | 705/38 |
| 6,904,412 | B1 | 6/2005 | Broadbent et al. | |
| 7,107,239 | B2 | 9/2006 | Graff | |
| 7,412,417 | B1 | 8/2008 | Tuttle | |
| 7,640,209 | B1 * | 12/2009 | Brooks et al. | 705/38 |
| 7,672,884 | B2 * | 3/2010 | Schuster et al. | 705/35 |
| 7,689,503 | B2 | 3/2010 | Halper et al. | |
| 7,752,124 | B2 * | 7/2010 | Green et al. | 705/38 |
| 7,814,005 | B2 * | 10/2010 | Imrey et al. | 705/38 |
| 7,925,579 | B1 | 4/2011 | Flaxman et al. | |
| 8,306,908 | B1 * | 11/2012 | Barker et al. | 705/38 |
| 2004/0267660 | A1 * | 12/2004 | Greenwood et al. | 705/38 |
| 2005/0131790 | A1 * | 6/2005 | Benzschawel et al. | 705/35 |
| 2006/0218079 | A1 * | 9/2006 | Goldblatt et al. | 705/38 |
| 2007/0043658 | A1 * | 2/2007 | DiPaolo et al. | 705/38 |
| 2008/0059364 | A1 | 3/2008 | Tidwell et al. | |
| 2009/0144128 | A1 * | 6/2009 | Polston et al. | 705/10 |
| 2011/0112946 | A1 * | 5/2011 | Porter | 705/35 |

OTHER PUBLICATIONS

FICO Features, Google search "fico score".*
Wikipedia, FICO, and FICO Score, May 18, 2013.*
Vantassel, Tim and Lehman, Bill, Reprinted with Permission from the Mortgage Bankers Association (MBA), Mortgage Banking, Apr. 2006 (5 pages), "Why Should I Care About Rules Engines?" (of-record in parent application).

* cited by examiner

*Primary Examiner* — Charles Kyle
*Assistant Examiner* — Siegfried E Chencinski
(74) *Attorney, Agent, or Firm* — Knobbe, Martens, Olson & Bear, LLP

(57) ABSTRACT

Some embodiments disclosed herein are directed to systems and methods for assessing mortgage lender and broker compliance. The systems and methods may receive loan pricing data, underwriting data, and/or borrower data from mortgage brokers and/or lenders, reconstruct the underwriting processes performed by lenders and brokers, and monitor many aspects of these processes. The reconstructed results may then be compared to the actual results to detect potential non-compliance of laws and/or regulations, including the practice of upstreaming and/or downstreaming. Because some embodiments of the invention greatly enhance the monitoring capability of mortgage regulators, they would motivate mortgage lenders and brokers to better conform their underwriting practice to existing laws and regulations.

15 Claims, 12 Drawing Sheets

1. LENDER / BROKER SENDS PRICING MODULES / SHEETS / ALGORITHMS USED
2. LENDER / BROKER SENDS UNDERWRITING GUIDELINES / ALGORITHMS USED
3. LENDER / BROKER SENDS BORROWER DATA IN FILE USED AT TIME OF UNDERWRITING
4. CALCULATES / RECONSTRUCTS UNDERWRITING PROCESS BY USING MODELS
5. DISPLAYS / REPORTS RESULTS

| Independent Reconstruction of Borrower File | Results Reported to Regulators | Yes | No |
|---|---|---|---|
| 1. Does credit decision in borrower file match independently obtained results? | | | |
| 2. If credit approved, does pricing match? | | | |
| 3. Did the borrower receive best available credit terms / pricing that borrower would have qualified? | | | |
| 4. Were approval / funding conditions the same or different from the borrower's file? | | | |
| 5. Did the lender / broker attempt to upstream the borrower? | | | |
| 6. Did the lender / broker attempt to downstream the borrower? | | | |
| 7. Any additional narrative constraints? | | | |

*FIGURE 2*

Good Faith Estimate (GFE)

OMB Approval No. 2502-0265

| Name of Originator | Borrower |
| --- | --- |
| Originator Address | Property Address |
| Originator Phone Number | |
| Originator Email | Date of GFE |

Purpose    This GFE gives you an estimate of your settlement charges and loan terms if you are approved for this loan. For more information, see HUD's *Special Information Booklet* on settlement charges, your *Truth-in-Lending Disclosures*, and other consumer information at www.hud.gov/respa. If you decide you would like to proceed with this loan, contact us.

Shopping for your loan    Only you can shop for the best loan for you. Compare this GFE with other loan offers, so you can find the best loan. Use the shopping chart on page 3 to compare all the offers you receive.

Important dates
1. The interest rate for this GFE is available through _____. After this time, the interest rate, some of your loan Origination Charges, and the monthly payment shown below can change until you lock your interest rate.
2. This estimate for all other settlement charges is available through _____.
3. After you lock your interest rate, you must go to settlement within ___ days (your rate lock period) to receive the locked interest rate.
4. You must lock the interest rate at least ___ days before settlement.

Summary of your loan

| | |
| --- | --- |
| Your initial loan amount is | $ |
| Your loan term is | years |
| Your initial interest rate is | % |
| Your initial monthly amount owed for principal, interest, and any mortgage insurance is | $ per month |
| Can your interest rate rise? | ☐ No ☐ Yes, it can rise to a maximum of %. The first change will be in . |
| Even if you make payments on time, can your loan balance rise? | ☐ No ☐ Yes, it can rise to a maximum of $ |
| Even if you make payments on time, can your monthly amount owed for principal, interest, and any mortgage insurance rise? | ☐ No ☐ Yes, the first increase can be in and the monthly amount owed can rise to $ . The maximum it can ever rise to is $ . |
| Does your loan have a prepayment penalty? | ☐ No ☐ Yes, your maximum prepayment penalty is $ . |
| Does your loan have a balloon payment? | ☐ No ☐ Yes, you have a balloon payment of $ due in years. |

FIGURE 4A

Escrow account information    Some lenders require an escrow account to hold funds for paying property taxes or other property-related charges in addition to your monthly amount owed of $ _____ .
Do we require you to have an escrow account for your loan?
☐ No, you do not have an escrow account. You must pay these charges directly when due.
☐ Yes, you have an escrow account. It may or may not cover all of these charges. Ask us.

Summary of your settlement charges

| | | |
| --- | --- | --- |
| A | Your Adjusted Origination Charges (See page 2) | $ |
| B | Your Charges for All Other Settlement Services (See page 2) | $ |
| A + B | Total Estimated Settlement Charges | $ |

Good Faith Estimate (HUD-GFE) 1

Understanding your estimated settlement charges

Your Adjusted Origination Charges

1. Our origination charge
   This charge is for getting this loan for you.

2. Your credit or charge (points) for the specific interest rate chosen
   ☐ The credit or charge for the interest rate of [____]% is included in "Our origination charge." (See item 1 above.)
   ☐ You receive a credit of $[____] for this interest rate of [____]%. This credit reduces your settlement charges.
   ☐ You pay a charge of $[____] for this interest rate of [____]%. This charge (points) increases your total settlement charges.
   The tradeoff table on page 3 shows that you can change your total settlement charges by choosing a different interest rate for this loan.

A Your Adjusted Origination Charges — $

Your Charges for All Other Settlement Services

*Some of these charges can change at settlement. See the top of page 3 for more information.*

3. Required services that we select
   These charges are for services we require to complete your settlement. We will choose the providers of these services.
   Service    Charge 4. Title services and lender's title insurance
   This charge includes the services of a title or settlement agent, for example, and title insurance to protect the lender, if required.

5. Owner's title insurance
   You may purchase an owner's title insurance policy to protect your interest in the property.

6. Required services that you can shop for
   These charges are for other services that are required to complete your settlement. We can identify providers of these services or you can shop for them yourself. Our estimates for providing these services are below.
   Service    Charge 7. Government recording charges
   These charges are for state and local fees to record your loan and title documents.

8. Transfer taxes
   These charges are for state and local fees on mortgages and home sales.

9. Initial deposit for your escrow account
   This charge is held in an escrow account to pay future recurring charges on your property and includes ☐ all property taxes; ☐ all insurance, and ☐ other [____]

10. Daily interest charges
    This charge is for the daily interest on your loan from the day of your settlement until the first day of the next month or the first day of your normal mortgage payment cycle. This amount is $[____] per day for [____] days (if your settlement is [____]).

11. Homeowner's insurance
    This charge is for the insurance you must buy for the property to protect from a loss, such as fire.
    Policy    Charge

B Your Charges for All Other Settlement Services — $

A + B Total Estimated Settlement Charges — $

 Good Faith Estimate (HUD-GFE)

FIGURE 4B

Instructions

Understanding which charges can change at settlement

This GFE estimates your settlement charges. At your settlement, you will receive a HUD-1, a form that lists your actual costs. Compare the charges on the HUD-1 with the charges on this GFE. Charges can change if you select your own provider and do not use the companies we identify. (See below for details.)

| These charges cannot increase at settlement | The total of these charges can increase up to 10% at settlement | These charges can change at settlement |
|---|---|---|
| ■ Our origination charge<br>■ Your credit or charge (points) for the specific interest rate chosen (after you lock in your interest rate)<br>■ Your adjusted origination charges (after you lock in your interest rate)<br>■ Transfer taxes | ■ Required services that we select<br>■ Title services and lender's title insurance (if we select them or you use companies we identify)<br>■ Owner's title insurance (if you use companies we identify)<br>■ Required services that you can shop for (if you use companies we identify)<br>■ Government recording charges | ■ Required services that you can shop for (if you do not use companies we identify)<br>■ Title services and lender's title insurance (if you do not use companies we identify)<br>■ Owner's title insurance (if you do not use companies we identify)<br>■ Initial deposit for your escrow account<br>■ Daily interest charges<br>■ Homeowner's insurance |

Using the tradeoff table

In this GFE, we offered you this loan with a particular interest rate and estimated settlement charges. However:
- If you want to choose this same loan with lower settlement charges, then you will have a higher interest rate.
- If you want to choose this same loan with a lower interest rate, then you will have higher settlement charges.

If you would like to choose an available option, you must ask us for a new GFE.

*Loan originators have the option to complete this table. Please ask for additional information if the table is not completed.*

|  | The loan in this GFE | The same loan with lower settlement charges | The same loan with a lower interest rate |
|---|---|---|---|
| Your initial loan amount | $ | $ | $ |
| Your initial interest rate¹ | % | % | % |
| Your initial monthly amount owed | $ | $ | $ |
| Change in the monthly amount owed from this GFE | No change | You will pay $ more every month | You will pay $ less every month |
| Change in the amount you will pay at settlement with this interest rate | No change | Your settlement charges will be reduced by $ | Your settlement charges will increase by $ |
| How much your total estimated settlement charges will be | $ | $ | $ |

¹ For an adjustable rate loan, the comparisons above are for the initial interest rate before adjustments are made.

Using the shopping chart

Use this chart to compare GFEs from different loan originators. Fill in the information by using a different column for each GFE you receive. By comparing loan offers, you can shop for the best loan.

|  | This loan | Loan 2 | Loan 3 | Loan 4 |
|---|---|---|---|---|
| Loan originator name |  |  |  |  |
| Initial loan amount |  |  |  |  |
| Loan term |  |  |  |  |
| Initial interest rate |  |  |  |  |
| Initial monthly amount owed |  |  |  |  |
| Rate lock period |  |  |  |  |
| Can interest rate rise? |  |  |  |  |
| Can loan balance rise? |  |  |  |  |
| Can monthly amount owed rise? |  |  |  |  |
| Prepayment penalty? |  |  |  |  |
| Balloon payment? |  |  |  |  |
| Total Estimated Settlement Charges |  |  |  |  |

If your loan is sold in the future

Some lenders may sell your loan after settlement. Any fees lenders receive in the future cannot change the loan you receive or the charges you paid at settlement.

FIGURE 4C

 Good Faith Estimate (HUD-GFE) 3

FIGURE 5A

|  |  |  |  |  | Before Changed Circumstances | | | At Closing | | | |
|---|---|---|---|---|---|---|---|---|---|---|---|
|  |  |  |  |  | Quoted | Calculated | | Actual/Closed | Calculated | | |
| Loan # | Original / New Loan | Chgd Circum? | Eligible for orig prod? | Amount | Rate Points Fees | Rate Points | Overage | Rate Points Fees | Rate Points | Overage | Fees |
| 234567 | Fixed / ARM | NewInfo | No | 100,000 | 4.500 0.875 $2,000 | 4.500 0.875 | 0.000 | 4.500 0.875 $3,000 | 4.500 0.875 | 0.000 | $1,000 |
| 234568 | Fixed / ARM | NewInfo | Yes | 100,000 | 4.750 -0.250 $2,000 | 4.750 -0.250 | 0.000 | 4.750 -0.250 $3,000 | 4.750 -0.250 | 0.000 | $1,000 |
| 234569 | Fixed | InacInfo |  | 100,000 | 4.500 1.000 $2,000 | 4.500 0.875 | 0.125 | 4.500 2.000 $3,000 | 4.500 0.875 | 1.125 | $1,000 |
| 234570 | ARM | No |  | 100,000 |  | 4.500 0.875 | -0.875 | 4.500 0.875 $3,000 | 4.500 0.875 | 0.000 |  |
| 234571 | ARM | No |  | 100,000 |  | 4.500 0.875 | -0.875 | 4.500 0.875 $3,000 | 4.500 0.875 | 0.000 |  |
| 234572 | Fixed | No |  | 100,000 |  | 4.500 0.875 | -0.875 | 4.500 0.875 $3,000 | 4.500 0.875 | 0.000 |  |
| 234573 | Fixed | No |  | 100,000 |  | 4.625 0.500 | -0.500 | 4.625 1.000 $3,000 | 4.625 0.500 | 0.500 |  |

| Loan # | Original /New Loan | Amount | GFE — Rate / Points / Fees | Locked — Rate / Points / Fees | Closed — Rate / Points / Fees | Diff — Rate / Points |
|---|---|---|---|---|---|---|
| 234511 | Fixed | 100,000 | 4.500 / 0.875 / $3,000 | 4.500 / 0.875 / $3,000 | 4.500 / 0.875 / $3,000 | 4.500 / 0.875 |
| 234512 | ARM | 100,000 | 4.500 / 0.875 / $3,000 | 4.500 / 0.875 / $3,000 | 4.500 / 0.875 / $3,000 | 4.750 / -0.250 |
| 234513 | ARM | 100,000 | 4.500 / 0.875 / $3,000 | 4.500 / 0.875 / $3,000 | 4.500 / 0.875 / $3,000 | 4.500 / 0.875 |
| 234514 | Fixed | 100,000 | 4.500 / 0.875 / $3,000 | 4.500 / 0.875 / $3,000 | 4.500 / 0.875 / $3,000 | 4.500 / 0.875 |
| 234515 | Fixed | 100,000 | 4.500 / 0.875 / $3,000 | 4.500 / 0.875 / $3,000 | 4.500 / 0.875 / $3,000 | 4.500 / 0.875 |
| 234516 | Fixed | 100,000 | 4.500 / -0.250 / $3,000 | 4.500 / -0.250 / $3,000 | 4.500 / -0.250 / $3,000 | 4.500 / 0.875 |
| 234517 | Fixed | 100,000 | 4.500 / 1.000 / $3,000 | 4.500 / 1.000 / $3,000 | 4.500 / 1.000 / $3,000 | 4.625 / 0.500 |

*FIGURE 5B*

| Loan # | Loan Type | Amount | Disposition | Actual Rate Points Fees | Calculated Rate Points Fees | Overage | Fees as a % of Loan Amount |
|---|---|---|---|---|---|---|---|
| 234511 | Fixed | 100,000 | Closed | 4.500<br>2.000<br>$3,000 | 4.500<br>0.875<br>$3,000 | 1.125 | 3% |
| 234512 | ARM | 100,000 | Closed | 4.500<br>0.875<br>$3,000 | 4.500<br>0.875<br>$3,000 | 0.000 | 3% |
| 234513 | ARM | 100,000 | Withdrawn | 4.500<br>0.875<br>$3,000 | 4.500<br>0.875<br>$3,000 | 0.000 | 3% |
| 234514 | Fixed | 100,000 | Closed | 4.500<br>0.875<br>$3,000 | 4.500<br>0.875<br>$3,000 | 0.000 | 3% |
| 234515 | Fixed | 100,000 | Closed | 4.750<br>-0.250<br>$3,000 | 4.750<br>-0.250<br>$3,000 | 0.000 | 3% |
| 234516 | Fixed | 100,000 | Denied | 4.625<br>1.000<br>$3,000 | 4.625<br>0.500<br>$3,000 | 0.500 | 3% |
| 234517 | Fixed | 100,000 | Cancelled | | | | |

*FIGURE 5C*

| Loan # | Loan Type | Amount | Disposition | Amount | ZIP / Census | FICO LTV CLTV | Actual/ Closed Rate Points Fees | Calculated Rate Points | Overage | Fees as a % of Loan Amount |
|---|---|---|---|---|---|---|---|---|---|---|
| 234530 | Fixed | 100,000 | Closed | 100,000 | 12345 72036.12 | 680 80 80 | 4.500 0.875 $3,000 | 4.500 0.875 $3,000 | 1.125 | 3% |
| 234531 | ARM | 100,000 | Closed | 100,000 | 12345 72036.12 | 680 80 80 | 4.750 -0.250 $3,000 | 4.500 0.875 $3,000 | 0.000 | 3% |
| 234532 | ARM | 100,000 | Withdrawn | 100,000 | 12345 72036.12 | 680 80 100 | 4.500 2.000 $3,000 | 4.500 0.875 $3,000 | 0.000 | 3% |
| 234533 | Fixed | 100,000 | Closed | 100,000 | 12345 72036.12 | 680 80 80 | 4.500 0.875 $3,000 | 4.500 0.875 $3,000 | 0.000 | 3% |
| 234534 | Fixed | 100,000 | Closed | 100,000 | 12345 72036.12 | 680 80 80 | 4.500 0.875 $3,000 | 4.750 -0.250 $3,000 | 0.000 | 3% |
| 234535 | Fixed | 100,000 | Denied | 100,000 | 12345 72036.12 | 680 80 80 | 4.625 1.000 $3,000 | 4.625 0.500 $3,000 | 0.500 | 3% |
| 234536 | Fixed | 100,000 | Cancelled | 100,000 | 12345 72036.12 | 680 80 80 | | | | |

*FIGURE 5E*

SYSTEM AND METHOD FOR ASSESSING MORTGAGE BROKER AND LENDER COMPLIANCE

CROSS-REFERENCE TO RELATED APPLICATIONS

This application is a continuation in part application of U.S. patent application Ser. No. 12/484,031, which claims the benefit of priority from U.S. Provisional Patent Application No. 61/077,424 filed on Jul. 1, 2008. The disclosure of both applications is hereby incorporated herein by reference.

BACKGROUND

1. Field

The present invention relates to computer systems for assessing that mortgage lenders and brokers comply with lending regulations.

2. Description of the Related Art

Federal, state, and local mortgage industry regulators have an obligation to ensure that mortgage lenders and brokers within their regulatory jurisdiction obey all applicable laws. Regulators must monitor compliance and detect absence of compliance as well as active violations. In addition, as part of civil court settlements or judgments and criminal plea agreements or criminal convictions, certain mortgage lenders and brokers may consent to additional monitoring by regulators or other outside parties.

These regulators are often charged with enforcing a wide variety of anti-discrimination laws, anti-predatory lending laws, licensing laws, privacy laws, as well as other laws and regulations. These laws require regulators to check, for example, whether mortgage rates and terms given to some consumers are materially less favorable than the most favorable terms available to a substantial portion of consumers, whether the loans offer net tangible benefits to borrowers, whether loan programs are suitable to the borrowers' wants and needs, and so forth.

Numerous existing commercial software programs check for mortgage related compliance of 300 or more federal, state and local statutes related to but not limited to; maximum charges, loan pricing, maximum fees and points (usury), annual percentage rate (APR), loan size, risk based pricing, allowance or disallowance of prepayment penalties, maximum dollar amount or percentage of allowable prepayment penalties and allowable timelines, required disclosures provided to borrowers, licensing, and jurisdiction-based allowable loan products or jurisdictional-based loan restrictions.

However, many of the existing compliance software programs/engines are usually rule based, not scorecard based and not intuitive in its artificial intelligence. The difference between a rule based approach and a scorecard based approach can be illustrated in a simple example of a police department that has a hiring requirement that recruits have to be at least 5'0", not weigh more than 250 lbs., and have no felony convictions. A rule based program will affirm compliance for a recruit that is 5'0", 249 lbs., and has 3 convictions for misdemeanor drunken driving. A scorecard based program will assign certain numerical values for each category of eligibility/deficiency/allowance/requirement/standard. Intuitively, the example recruit is not an ideal candidate, and as such the scorecard based program will likely reject him.

Currently, each lender or broker uses its own propriety software and internal business process in its loan underwriting/decisioning process. The entire process offers little transparency and there exists no simple way to determine whether the lender or broker is in compliance with the applicable regulation. In addition, regulators have limited time and resources to monitor compliance and investigate suspected non-compliance in lenders or brokers within their jurisdiction. Therefore, regulators need faster, more efficient, more cost-effective ways to perform all of their duties or monitoring, preliminary analysis, and full investigations.

SUMMARY OF THE DISCLOSURE

Some of the embodiments disclosed herein are directed to systems and methods for assessing mortgage lender and broker compliance. The systems and methods may assist regulators in reconstructing the underwriting processes performed by lenders and brokers and monitoring many aspects of these underwriting processes. The systems and methods may preferably receive borrower data, underwriting data, and/or loan pricing data from one or more lenders and/or brokers and provide reconstructed loan pricing data. The reconstructed loan pricing data may then be compared to the received loan pricing data to determine if there is potential non-compliance with lending laws and/or regulations. Because some embodiments of the invention greatly enhance the monitoring capability of mortgage regulators, they would motivate mortgage lenders and brokers to better conform their underwriting practice to existing laws and/or regulations. The invention may also push mortgage lenders and brokers into "up-streaming" borrowers; giving borrowers the best offers they could have received.

Additional embodiments are directed to providing tools for detecting and/or verifying whether such a lending violation occurred, with the detection parameters customizable by an interested party such as an attorney. For example, an attorney in California meeting with a prospective client can enter a client's loan data into a system configured for detecting both California and Federal violations and have the loan reconstruction method performed on the entered data. The results can better prepare the attorney in evaluating and/or prosecuting claims against the lenders and/or brokers who may have committed a lending violation. In another embodiment, the loan compliance monitoring system disclosed herein may be configured to provide to an attorney or an interested party pattern and practice analysis of historical transactions for a particular lending organization.

One embodiment takes into account new Real Estate Settlement Procedures Act (RESPA) regulations that took effect on Jan. 1, 2010 and evaluates compliance with the new RESPA regulations. The embodiment analyzes loan data received from lenders/brokers and determines compliance with various components of the new RESPA regulations, including rules governing the Good Faith Estimate (GFE) and the Changed Circumstances exception.

Other embodiments include a historical database of loan reconstruction results data so that a particular lender/broker can be tracked or its compliance history may be compared to other lenders and/or brokers. In one embodiment, pattern and practice data of an individual lender/broker level can be compared against similar situated lenders and brokers to detect any non-obvious violation such as redlining and steering that may be difficult to detect on a transaction-by-transaction analysis. The results of the comparison may be provided in the form of a quality scorecard so that potential borrowers can easily determine the trustworthiness of potential lenders and brokers.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIG. 2 is a diagram that illustrates a sample set of results according to one embodiment;

FIGS. 4A-4C show pages of an example Good Faith Estimate form;

FIGS. 5A-5E illustrate sample reporting outputs provided by a compliance monitoring system in accordance with another embodiment.

DETAILED DESCRIPTION OF THE PREFERRED EMBODIMENTS

Figure 1:
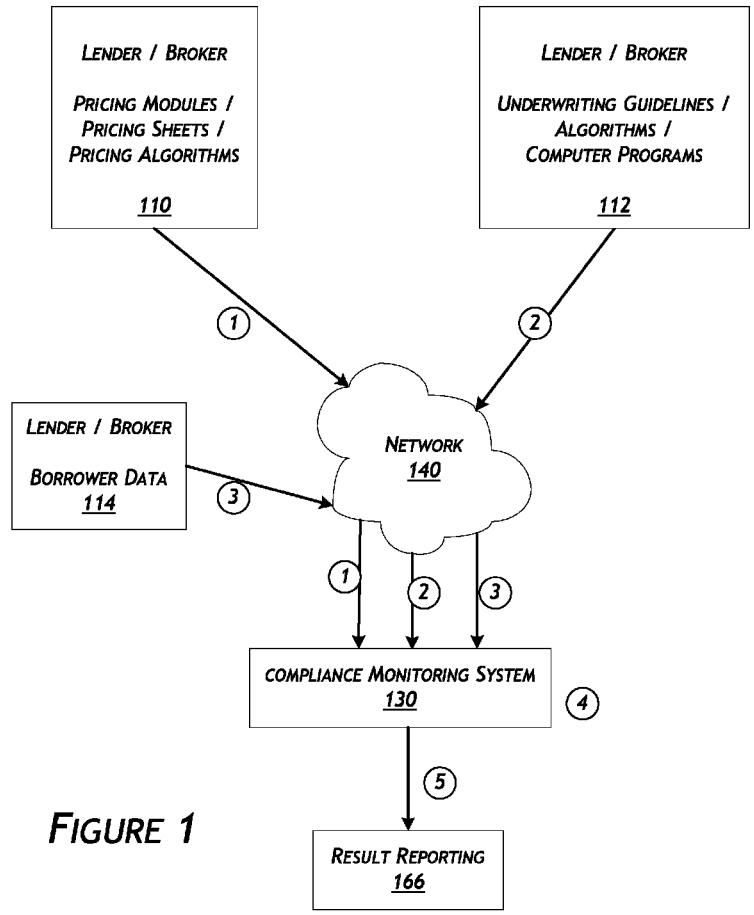
FIG. 1 is a state diagram of an illustrative compliance monitoring system according to one embodiment.

The various embodiments provide systems and methods for assessing mortgage broker and lender compliance, and the embodiments work with both rules based and scorecard based software models/engines. Embodiments may be implemented through the following four types of software models/engines: automated underwriting systems (AUSs) (decision engines), product-pricing-eligibility engines (PPEs), workflow automation system (business process management (BPMs)), and general purpose/all purpose rules engine. AUSs and all-purpose rules engines are capable of reading credit reports and evaluate those credit reports against loan programs/pricing for the purpose of rendering a loan decision of approved, denied or referred. These models may be used to reconstruct the underwriting process so regulators can compare their reconstructed results (i.e., loan terms) against the actual loan terms that were offered to the consumers.

In one embodiment, the algorithms used to model the underwriting process can be weighted to consider historical loan performance data of thousands of similarly situated borrowers (predictive modeling). In turn, predictive modeling is used for risk-based pricing. For example, if historical data analysis of several thousand files indicates that a higher percentage of loan defaults come from borrowers who average less than 2 years on their job with FICO credit scores of less than 620 and have $2,000 or less of cash reserves after the financing of the property is completed, then loans with these borrower data are deemed to be riskier. Therefore, risk-based pricing will indicate that such borrowers should be charged more points, a higher interest rate, or both.

Compliance Monitoring System

Embodiments provide computer-implemented compliance monitoring systems and methods through which regulators can reconstruct the previously completed underwriting processes and determine whether the processes met legal requirements. The compliance monitoring system embodiments may solve a number of problems with the existing method of regulation:

Lack of Uniformity in the Proprietary Software Used by Mortgage Lenders and Brokers—These software do not have uniform error handling capabilities, such that it cannot be determined if a failure in user acceptance testing is caused by one rule or multiple rules.

Lack of Accountability in the Creation and Maintenance of the Propriety Software—Regulators cannot assume system wide or company wide compliance or non-compliance due business processes, in-house software systems or out-sourced systems as well as organizational responsibilities.

Little or No Testing Performed and Lack of Documentation—Programmers who are responsible for updating the brokers' or lenders' underwriting guidelines and underwriting rules, pricing, and compliance requirements may do little or no testing of mandated updates to their systems. They may or may not keep physical or electronic records of their updates. Large lenders or brokers may work from different systems or have different administrative controls; for example one group may control only the wholesale sales channel but not for the retail pricing, internet, or correspondent channel. Other organizations may assign responsibility by geographic region.

No Easy Way to Determine Whether Published Guidelines are Codified in the Software—Regulators also have no way to confirm if lenders' or brokers' written/published underwriting guidelines are properly coded and tested into the loan eligibility, pricing, and underwriting (decision) software used.

No Easy Way to Detect "Downstreaming"—Currently regulators have no way to know or detect if a borrower has been "down-streamed" (offered less than best available credit, mortgage terms and/or pricing). Downstreaming may be a criminal act or it may be a civil violation or civil tort related to "unfair and deceptive business practices" statutes.

Embodiments use the above-described four types of models and provide a separate reconstruction modeling of the underwriting process on a completely separate platform from the lenders' and/or broker software operating platform. Other embodiments may be in duplicative form (e.g., software languages such as java script, .net, etc.) and software/systems/platform or different form and/or different systems/platforms for the purpose of replicating or mimicking the documented results reported by the lenders and/or brokers.

Compliance Monitoring System—Data Upload

Embodiments of the compliance monitoring system enable regulators to determine whether the lenders or brokers followed the required protocols by reconstructing the loan underwriting process. FIG. 1 shows an illustrative embodiment. A compliance monitoring system 130 is configured to accept, among other things, three types of input from one or more mortgage lenders, brokers, and/or other entities. As shown, in state one, a lender or broker may send to the compliance monitoring system 130, via network 140, pricing modules, pricing sheets, and/or pricing algorithms (110) used at the time of loan underwriting or origination. In state two, the lender or broker may send to the compliance monitoring system 130, via network 140, underwriting guidelines, algorithms, and/or computer programs (112) used at the time of loan underwriting or origination. In state three, the lender or broker may send to the compliance monitoring system 130, via network 140, borrower data obtained at the time of loan underwriting or origination. The data may include information within the borrower file that was used to calculate the terms of the loan offer, as well as the actual terms of the loan offered to the specific borrower.

In one embodiment, the data sent in states one and two may be sent periodically, for example, weekly, monthly, quarterly, semi-annually or annually. The data sent in state three, which includes borrower data, may be sent more frequently, for example, as soon as a borrower obtains a loan from the lender or broker. In one embodiment, borrower data 114 as well as pricing module data 110 and underwriting and/or software data 112 are sent in a uniform format to facilitate ease of data integration. For example, regulators who use the compliance monitoring system 130 can mandate lenders and brokers within their jurisdiction to report data in a uniform format.

In one embodiment, the compliance monitoring system 130 is configured to receive the aforementioned data electronically. Thus, a lender or broker may upload the data to be uploaded electronically to the compliance monitoring system 130. Any paper-based documentation may be converted to electronic format and accepted by the compliance monitoring system 130.

Borrower data 114 may additionally include the loan file information, the application, the mathematical worksheets (conventional, FHA and VA all use different worksheets to show income, debts, income and debt ratios, assets, cash reserves, payment shock), the file credit report used during that time period, all disclosures, the Good Faith Estimate of Costs, the rate sheet or rate information used to price files during that time period, the electronic appraisal, and so forth.

Underwriting and/or software data 112 may additionally include any records that the lender or mortgage brokers claim to have updated (programmed) into their system. This may include pricing, underwriting guidelines, loan decision algorithms, and evolving historical loan performance data that is weighted to influence, and as needed, to change risk-based pricing.

Compliance Monitoring System—Calculation and Reporting

Returning to FIG. 1, in one embodiment, in state four the compliance monitoring system 130 calculates the terms of the loan based on borrower data 114, pricing module data 110, and underwriting and/or software data 112. The results of the calculation may then be compared to the actual loan terms that were offered to the borrower as indicated in borrower data 114. In one embodiment, before the compliance monitoring system 130 is operative, it undergoes testing with test cases to ensure that its models and calculations are performing correctly.

In one embodiment, the compliance monitoring system 130 uses a baseline model in its calculation and any additional pricing module data 110 and underwriting and/or software data 112 from the lender or broker. In one embodiment, the baseline model is based on a model used in the Desktop Underwriter and Loan Prospector software made by Fannie Mae and Freddie Mac. As stated above, in one embodiment, a scorecard based model may be used, and a score may be assigned based on comparison between the loan terms of the reconstructed pricing data and the loan terms of the received actual pricing data. In one embodiment, the scorecard is based on a summing of the individual scores, some or all of which may be weighted. For example, a score of one weight may be assigned to the difference in rates (reconstructed vs. actual), and another score of a different weight may be assigned to the difference in closing costs. While a rule-based approach that focuses on an individual term (such as rate) may detect more flagrant non-compliance, the scorecard approach taken in various embodiments can be configured to detect more subtle potential problems, such as when both the actual rates and closing costs are higher than the reconstructed results by a slight amount that would normally be within the acceptable threshold of a rule-based system, but nonetheless taken together would indicate potential problems with the overall loan file.

In other embodiments, if additional pricing module data 110 or underwriting and/or software data 112 from the lender is not available, industry standard guidelines are used as part of the modeling (e.g., guidelines maintained by the Mortgage Industry Standards Maintenance Organization (MISMO)).

With these input, the compliance monitoring system 130 can reconstruct the underwriting/loan decisioning process. This enables regulators to see if the actual output (results) are consistent with the lenders' or mortgage brokers' policies, pricing, underwriting rules and guidelines in consideration of the borrowers' files. If necessary, the regulator or contract agency on behalf of the regulator can then conduct the actual audit of the loan files in question. In addition, the compliance monitoring system may extract from the borrower and/or underwriting data relevant data to calculate additional criteria such as the borrowers' ability to repay the loan, net tangible benefit, etc.

In state five, the results may be reported to the regulators. In one embodiment, results are sent automatically. In other embodiments, the compliance monitoring system 130 includes interfaces that regulators can access to view the results. FIG. 2 shows a sample interface of the result reporting module 166 in accordance to one embodiment. As shown, the sample reporting includes results relating to the following monitoring criteria (190), though other relevant criteria may be used:

1. Does credit decision in borrower file match independently obtained results?
2. If credit approved, does pricing match?
3. Did the borrower receive best available credit terms/pricing that borrower would have qualified?
4. Were approval/funding conditions the same or different from the borrower's file?
5. Did the lender/broker attempt to upstream the borrower?
6. Did the lender/broker attempt to downstream the borrower?
7. Any additional narrative constraints?

In one embodiment, the result reporting module 166 can send regulators an alert if the reconstructed results fail one or more of these criteria. In addition, a regulator can examine any part of the loan file in the borrower data which may include the application, appraisal, title report, credit report, income verification (tax returns, W-2's, paystubs, contracts, 1099's, asset verification (bank deposit receipts, bank statements, verification of deposits, mutual funds, any retirement accounts that contain liquid assets), credit explanation letters, releases from third parties, budgets, net tangible benefit letters, suitability letters, personal financial statements, loan disclosures, loan contracts (mortgage note or deed of trust), Regulation Z Truth-in-Lending statement, Good Faith Estimate, Equal Credit Opportunity Act disclosure, and any other legally required disclosures.

In one embodiment, the result reporting module 166 is configured to send a report, via electronic or other means, to one or more regulatory agencies when a lender's cumulative data reaches a certain pre-defined threshold of deviation or non-compliance. For example, a regulator may configure the result reporting module 166 to alert the regulator when 10% (or another pre-determined threshold) of a particular lender's borrowers are offered terms that are less favorable than the eligible terms calculated by the compliance monitoring system. The result reporting module 166 can be configured to alert the regulator based on a variety of triggering conditions, including a set threshold numbers/percentages of non-compliance, a threshold percentage of erroneous lender calculations, and so forth. The report may also be sent to the broker or lender whose data have triggered the non-compliance notification(s). In one embodiment, the report may be sent to the individual consumer(s) whose loan(s) have triggered the potential non-compliance notification(s).

System Implementation

Figure 3:
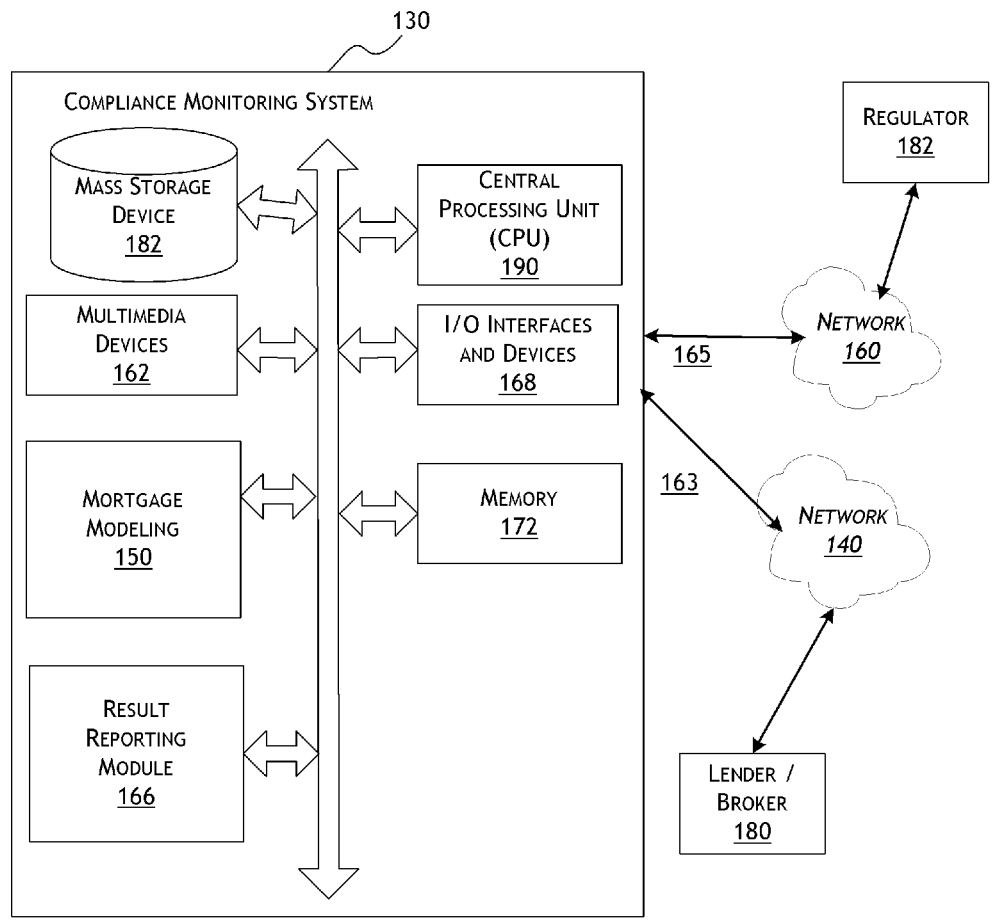
FIG. 3 is a block diagram of the system according to one embodiment.

FIG. 3 is a block diagram illustrating the compliance and monitoring system 130 in accordance with one embodiment. The compliance and monitoring system 130 includes, for example, a personal computer that is IBM, Macintosh, or Linux/Unix compatible. In one embodiment, the compliance and monitoring system 130 comprises a server, a desktop computer, a laptop computer, a personal digital assistant, a kiosk, or a mobile device, for example. In one embodiment, the sample compliance and monitoring system 130 includes a central processing unit ("CPU") 190, which may include one or more conventional microprocessors. The compliance and monitoring system 130 further includes a memory 172, such as random access memory ("RAM") for temporary storage of information and a read only memory ("ROM") for permanent storage of information, and a mass storage device 182, such as a hard drive, diskette, or optical media storage device. Typically, the components and modules of the compliance and monitoring system 130 are connected to the computer using a standard based bus system. In different embodiments, the standard based bus system could be Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of compliance and monitoring system 130 may be combined into fewer components and modules or further separated into additional components and modules.

The compliance and monitoring system 130 is generally controlled and coordinated by operating system software, such as Windows Server, Linux Server, Windows 98, Windows NT, Windows 2000, Windows XP, Windows Vista, Unix, Linux, SunOS, Solaris, or other compatible server or desktop operating systems. In Macintosh systems, the operating system may be any available operating system, such as MAC OS X. In other embodiments, the compliance and monitoring system 130 may be controlled by a proprietary operating system. Conventional operating systems control and schedule computer processes for execution, perform memory management, provide file system, networking, I/O services, and provide a user interface, such as a graphical user interface ("GUI"), among other things.

The sample compliance and monitoring system 130 includes one or more commonly available input/output (I/O) devices and interfaces 168, such as a keyboard, mouse, touchpad, and printer. In one embodiment, the I/O devices and interfaces 168 include one or more display device, such as a monitor, that allows the visual presentation of data to a user. More particularly, a display device provides for the presentation of GUIs, application software data, and multimedia presentations, for example. The compliance and monitoring system 130 may also include one or more multimedia devices 162, such as speakers, video cards, graphics accelerators, and microphones, for example. In other embodiments, such as when the compliance and monitoring system 130 comprises a network server, for example, the computing system may not include any of the above-noted man-machine I/O devices.

In the embodiment of FIG. 3, the I/O devices and interfaces 168 provide a communication interface to various external devices. For example, the compliance and monitoring system 130 is electronically coupled to the networks 140 and 160, both of which may comprise one or more of a LAN, WAN, or the Internet, for example, via a wired, wireless, or combination of wired and wireless, communication links 163 and 165. The networks 140 and 160 facilitate communications among various computing devices and/or other electronic devices via wired or wireless communication links. The compliance monitoring system may use networks 140 and 160 to communicate with a lender 180 and a regulator 182, respectively. In other embodiments, networks 140 and 160 may be the same network.

As shown in FIGS. 1 and 3, data from lender or broker 180 may be sent to the compliance and monitoring system 130 over the network 140. Similarly, results may be returned over the network 160 to regulator 182. In addition to the devices that are illustrated in FIG. 3, the compliance and monitoring system 130 may communicate with other data sources or other computing devices. In addition, the data sources may include one or more internal and/or external data sources. In some embodiments, one or more of the databases, data repositories, or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

The compliance and monitoring system 130 may also include a mortgage modeling module 150 to model the underwriting calculations and a result reporting module 166 that may be executed by the CPU 190 to provide periodical or instantaneous compliance reports to the regulator 182. The mortgage modeling module 150 and the result reporting module 166 may be implemented as one or more modules, which may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Alternately, the one or both of the modules may be implemented as separate devices, such as computer servers.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Anonymous Testing and Coding of System

In one embodiment, components of the compliance monitoring system are tested using test cases for accuracy, ensuring no false positives or false negatives. The accuracy test cases and the software program programming can be done in an anonymous manner that masks the lender's and/or broker's information, ensuring fairness and impartiality.

Testing and programming of the compliance monitoring system may be done anonymously so that the testers and programmers do not know the actual identity of the actual regulator who will employ the system. Similar to a doubleblind study, this can offer further assurance that the coding and testing is being done in a completely objective manner. In addition to objectivity, regulators may want to keep their identity secret so that lobbyists paid by the parties being investigated do not know exactly which legislative body, executive body or judicial body to contact and complain to, in order to pressure the lawmakers, executive branch or petition judicial action through lawsuits to call off the enforcement/audit team.

Additional Monitoring Embodiments and Implementations

In one embodiment, the compliance monitoring system performs its monitoring through the use of survey data that incorporates baseline pricing data. In another embodiment, the compliance monitoring system tracks the Good Faith Estimates (GFE) and Truth-In-Lending Statements (TILs) of the broker/lender submitted data to ensure compliance. Survey data may be collected manually (e.g. via human-conducted surveys) or automatically (e.g. via data mining or web scraping) and received by the compliance monitoring electronically or manually or through other suitable means.

In one embodiment, the borrower data (i.e., borrowers' files), underwriting data, and/or pricing data may be reported electronically by the participating brokers, lenders and/or other financial institutions (e.g., via email or via a spreadsheet format such as Excel). The incoming data report may include one or more of the following data fields (in aggregate for loans for the submitting broker/lender or for individual loans):

1) loan number for reference (in one embodiment, only approved loans are submitted, denied loan applications are not submitted)

2) credit scores of the borrowers (e.g. lowest middle FICO score of all co-signers)

3) loan-to-value (LTV)

4) income and debt ratios 5) whether the transaction was a purchase, refinance, or cash-out refinance 6) whether the subject property was owner or non-owner occupied 7) number of units 8) whether the subject property was a single family residence (SFR), planned unit development (PUD), a condo, or a CO-OP 9) final note rate and final TIL APR 10) if the loan was an Adjustable Rate Mortgage (ARM), a margin/life cap/periodic caps/index 11) indications on how many GFEs and TILs were issued for the file 12) actual note rate and dollar amount of non-recurring closing costs for each GFE issued 13) actual APR quoted for each of the TILs issued 14) loan type: conventional, FHA, VA, other (including new programs when they emerge)

15) whether the loan was a second mortgage or home equity line of credit 16) state and county where property is located 17) percentage and number of approved loans that actually funded.

18) lock date and numbers of days locked 19) other data fields to accommodate non-traditional or one-off loan products 20) other relevant benchmarking data points In one embodiment, the compliance monitoring system compares the received pricing data from the broker and lender to the survey data in the context of the received borrower and/or underwriting data. In one embodiment, the compliance monitoring system uses baseline historical pricing data as a starting set of data, with periodic updates obtained from an external source that provides recent mortgage data (e.g. HSH Associates, Weekly Freddie Mac Surveys). The baseline and updated pricing data may include risk-based pricing adjustment data (or "bumps") based on the borrower data. For example, a change in the FICO credit score of 40 points may be reflected in a risk-based pricing adjustment, or bump, of 0.25%. In one or more embodiments, the risk-based pricing adjustments are taken into account during the calculations.

The comparison may be set in some embodiments to allow certain tolerance in the received data. For example, a tolerance on the rate may be set at 0.375%, so that a loan is flagged as potentially non-compliant if it differs by more that this amount from the baseline pricing based on similar borrower data. Similar tolerance may be set for fees. For example, the tolerance may be set as 2% of the loan amount for non-recurring closing costs (assuming a 1% origination fee). In other embodiments, the tolerance on fees can be 0.500% of the loan amount or $1,500, whichever is greater. The latter tolerance figures may address skewing because smaller loans tend to have a higher dollar amount of fixed costs.

In one or more embodiments, one or more of the above data fields, along with the comparison results, are sent by the compliance monitoring system as part of the compliance report. The compliance monitoring system may also provide alternative handling when a particular data field requires such handling. For example, although in some embodiments the default data fields are for issued loans, if among the submitted data there are pending loan files due to long escrow periods, the compliance monitoring system may report numbers and percentages reflective of the pending files. Similarly, approved and cancelled loan files may be reported in numbers and percentages as well.

Licensing and tracking of all mortgage loan originators and originator companies (banks, mortgage bankers, mortgage brokers, credit unions, etc.) at the state, federal or a cooperative level such as the nationwide mortgage licensing system (NMLS) via the Conference of State Bank Supervisors is necessary to protect consumers, improve supervision and enforcement of licensed entities and streamline the licensing process. Every loan originator and company may be assigned a license number (similar to a driver's license) at each state level, federal level (i.e. FHA approval number) or through the state regulatory registry LLC (SRR). Eventually, licensing could be federalized (similar to a social security number). The originator or company license number can also be used by regulators to track behavior of loan originators and/or companies. Scorecards and/or reporting can be kept for individuals and/or companies regarding all of the information described in this invention. In addition, loan performance can be tracked and reported to regulators, originators, companies, consumers or any other stakeholders (on-time borrower payment, payment delinquencies, loan defaults, loan churn which means how often borrowers refinance connected to that originator or company). The scorecards and/or reporting may be done transparently through public information posting or privately such as terms of a legal settlement requiring monitoring done with restricted access to who may see the reports.

The reported information from embodiments of the present invention can be used to monitor and maintain licensing, revoke licensing, suspend or put originators on probation. Loan originators and companies may use these reports to demonstrate to investors (those that provide funds for mortgages), consumers, liability insurance carriers, regulators and any other stakeholders that their conduct and performance is comparably better. Therefore, the reported information from various embodiments may be used to advantageously provide the originator and/or company benefits (e.g., less restrictive licensing supervision, better terms for consumer extended mortgages, less expensive liability insurance, compensation increases, job recruitment advantages, etc.).

Compliance Detection and Reporting—RESPA

Additional embodiments disclosed herein are also configured to specifically detect and report potential non-compliance of the RESPA, including new regulations of RESPA that took effect on Jan. 1, 2010. There are two primary requirements under the new RESPA regulations. The first is that most loan terms provided in the Good Faith Estimate (GFE) must be the same or substantially the same (subject to a 10% increase cap) to those provided at closing, absent any changed circumstances. The second is that only those fees and terms affected by the changed circumstance(s) can be raised. An example of a changed circumstance is the loss of income of a spouse. Other example changed circumstances are listed below:

Acts of God, war, disaster or other emergencies
Loan locks after GFE is provided
Borrower requests a change to a Lock
Lock Period Expires
Credit Quality Change due to new information received
Loan Amount Changes
Legal Address Error
Property Value Change
Product Type/Loan Program Change
Underwriting Conditions require additional services
Property Type Change
Title Binder requires additional conditions
Occupancy Change
Unique property characteristic not known at time of application that impacts cost of the appraisal
Borrower Requested Mortgage Insurance Program Change
Borrower Requested Change to Escrow Account Selection An example GFE is shown in FIGS. 4A-4C. As shown, the GFE lays out for the loan applicant(s) the terms of the loan, and a section shown in FIG. 4C explains the afore-mentioned prohibitions on term changes. For example, the top portion of FIG. 4C explains that most charges quoted on the GFE cannot change at closing, and certain charges for required services can be increased only up to 10% at closing, and other charges may be changed at closing.

One embodiment of the compliance monitoring system 130 receives up to 51 data input fields from a lending organization (e.g. lender or broker), including loan amount, loan pricing, settlement costs, credit scores, income, ZIP code, the borrower's race, and the borrower's gender. Once the data is entered, transmitted, or otherwise provided to the compliance monitoring system 130, the compliance monitoring system 130 reconstructs a pricing range in the manner as described above and compares it to the actual offered pricing as provided in the data submitted by the lending organization. A list of the input fields is provided below:

| | |
|---|---|
| Transaction Type | Loan Amount |
| Batch Identifier | Purchase Price |
| LoanApp Number | Appraised Value |
| Property City | SubFinancing Amount |
| Property State | HELOC Line |
| Property County | HELOC Balance |
| Property Zip code | Cashout Amount |
| Property Type | Occupancy Type |
| Document Type | Units |
| Product Code | Loan Purpose |
| Lock Term | Refinance Purpose |

-continued

| | |
|---|---|
| Initial Rate | Loan Type |
| Final Rate | ARM Margin |
| Lender Fees | GFE Create Date |
| Origination Fees | Lock Date |
| Title Fees | Closed Date |
| Settlement Fees | Lien Type |
| Borrower Specified Title or Settlement Service | Prepayment Options |
| Discount Points | Escrow Type |
| Total Debt | Ethnicity |
| Total Housing | Race |
| Total Income | Gender |
| Credit Score | EnergyStar |
| | EnergyStar Percentage |

In one embodiment, with respect to the RESPA, the compliance monitoring system 130 detects whether the stated changed circumstances supports the change in pricing between those stated in the GFE and those offered at closing. For example, the system may detect if a lending organization had used a changed circumstance as an excuse to illegally raise the price (e.g. interest rate or points or fees) at closing, or raised the price beyond the legally acceptable amount as described above. The compliance monitoring system may output one or more of the following warning flags after the reconstruction and/or data verification process: (1) a flag indicating the applicant was still eligible for the original price but the price changed at closing, (2) a flag indicating price increase by showing that the increased price was padded, providing overage beyond the risk based pricing calculations made by the reconstruction process of the compliance monitoring system 130, (3) a flag indicating an increase in origination fees and/or required services fees beyond allowable tolerances under the REPSA. Besides these flags, the changed circumstances output in one embodiment also includes percentages of loans for a particular lender that triggered such warning flags, and the total amount involved in loans with warning flags. Additional details of the changed circumstances analysis are provided below in the description of FIG. 5A, which shows a sample changed circumstances test report.

In one embodiment, the compliance monitoring system 130 is also configured to determine differences among three primary data points, which are: (1) price data in the HUD-1 form (which lists the loan terms at the time of closing), (2) price data from the GFE, and (3) price data at the time of the internal rate lock. In one embodiment, if any of the three data points shows discrepancies beyond the allowable tolerances under the aforementioned RESPA regulations, the compliance monitoring system 130 will issue a number of outputs. The outputs may include one or more flags to indicate such changes, including flags for increases in rates, flags for increases in loan origination charges, and flags for required services tolerance violations (i.e. increase of more than 10% for fees for these services). Additional details of the comparison among the prices from the GFE, from the rate lock, and at closing are provided below in the description of FIG. 5B, which shows a sample pricing comparison report.

In one embodiment, the output for both changed circumstances and the price comparison may further include scorecards indicating the percentages of loans in which such violations have been detected and the total amount involved. The output may additionally include pattern and practice analysis based on reconstructed data for a lending organization stored over a specified period of time (e.g. a month, a quarter, or a year). The scorecards and/or pattern and practice analysis provide historical overviews of the performance of the lending organizations and can assist interested parties (e.g. government regulators, courts, public interest groups, consumer groups, and attorneys) in monitoring lending organizations.

Compliance Detection and Reporting—Other Potentially Illegal Practices

In other embodiments, the compliance monitoring system 130 is also configured to detect three additional potentially illegal discriminatory practices: (1) pricing disparity, (2) loan denial disparity, and (3) redlining. With respect to pricing disparity, the reconstruction process of the compliance monitoring system 130 in one embodiment attempts to determine whether similarly situated applicants are receiving similar quotes regardless of factors such as race, ethnicity, gender, age, or other protected class status. The output may include any detected higher rates, loan origination charges, and required services tolerance violations. Additional details of the pricing disparity analysis are provided below in the description of FIG. 5C, which shows a sample pricing disparity test report.

With respect to loan denial disparity, the reconstruction process of the compliance monitoring system 130 in one embodiment attempts to determine whether qualified applicants in federally protected classes (e.g. race, gender) are being denied credit. The output may include data flags highlighting those applicants who were eligible but were denied credit, along with the stated reason(s) for denial. The output may additionally sort such applicants by their respective protected classes. Additional details of the loan denial disparity analysis are provided below in the description of FIG. 5D, which shows a sample loan denial test report.

Finally, with respect to redlining, the reconstruction process of the compliance monitoring system 130 in one embodiment attempts to determine whether lending organizations are refusing to make loans in certain geographic areas. The output may include geographic distribution of loans by a particular lending organization, along with credit and demographic characteristics of the geographic areas. Parts or all of the above output may be organized by census data tract or other geographic dividers such as city or country boundaries or ZIP codes. Additional details of the redlining analysis are provided below in the description of FIG. 5E, which shows a sample redlining test report.

In one embodiment, the output for the detection of these three types of potentially illegal activities may further include scorecards indicating the percentages of loans in which such potentially illegal activities have been detected and the total amount involved. The output may additionally include pattern and practice analysis based on reconstructed data for a lending organization stored over a specified period of time (e.g. a month, a quarter, or a year). The scorecards and/or pattern and practice analysis provide historical overviews of the performance of the lending organizations and can assist interested parties (e.g. government regulators, courts, public interest groups, consumer groups, and attorneys) in monitoring lending organizations.

System Implementation of the Additional Embodiments

Figure 4D:
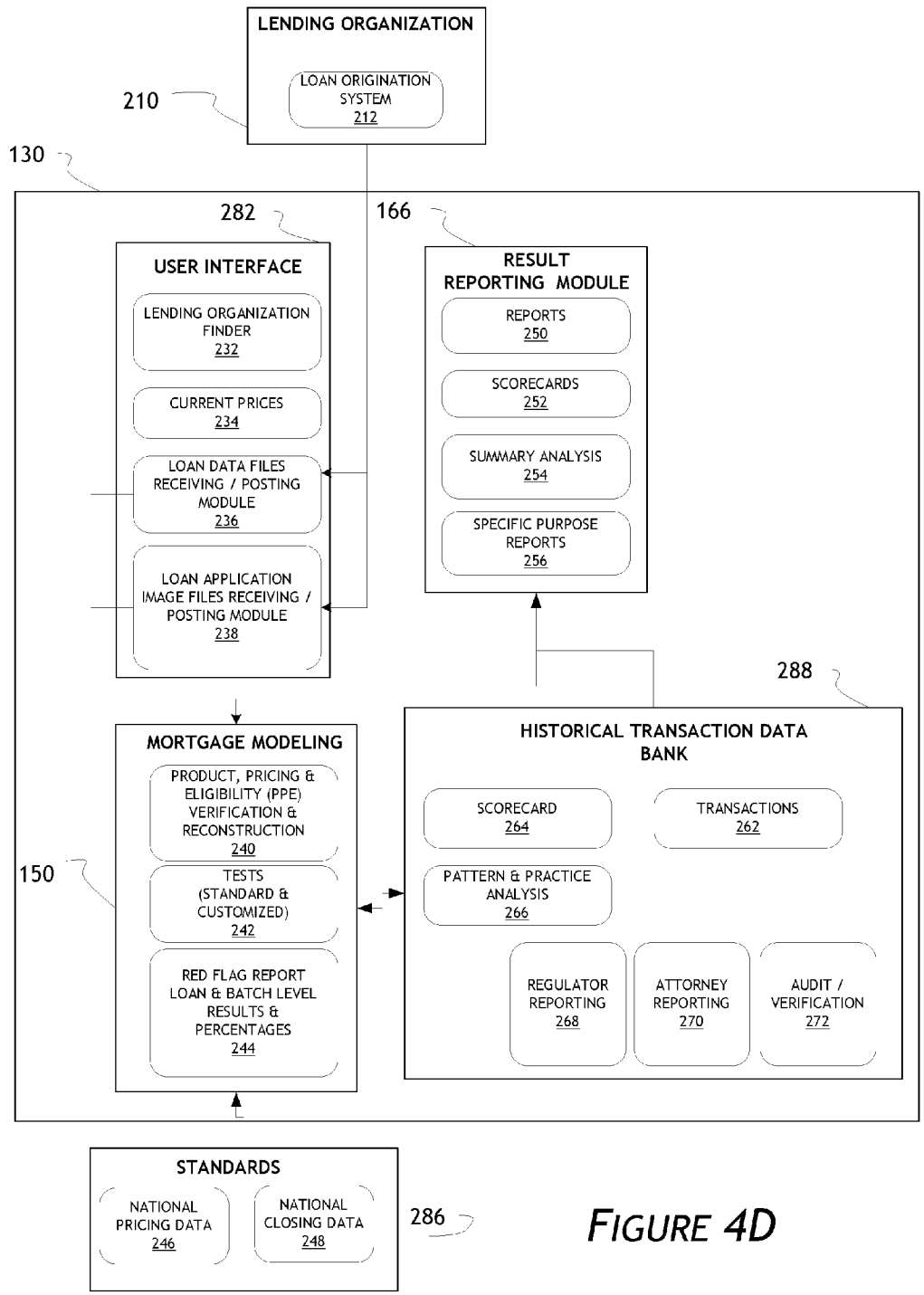
FIG. 4D is a block diagram of a compliance monitoring system in accordance with another embodiment.

FIG. 4D shows another embodiment of the compliance monitoring system 130 that is configured to detect non-compliance of lending laws and regulations including the aforementioned new RESPA regulations. In one embodiment, the compliance monitoring system 130 receives various types of data from a lending organization 210 (e.g. from a loan origination system 212 of the lending organization 210). The data may include pricing sheets, pricing modules, pricing algorithms, underwriting guidelines/algorithms/programs, borrower data, and other type of data shown in FIG. 1. The data may also include images of the actual loan files. As shown, the compliance monitoring system 130 may include the following components in place of or in addition to those shown in FIG. 3: a user interface 282, the mortgage modeling module 150, and a historical transaction data bank 288. As shown, in one embodiment, the compliance monitoring system 130 also includes the result reporting module 166. In another embodiment, the compliance monitoring system 130 receives data from a standards database 286 or includes it as part of the system 130.

The user interface 282 may include a lending organization finder 232 and a display of current prices 234 to aid potential borrowers in locating a lending organization and obtaining the current prices in the market. In one embodiment, the user interface 282 includes additional components that handle input of data. The user interface 282 in one embodiment includes a loan data files receiving/posting module 236 for receiving data from the lending organization(s) 210 and a loan application image files receiving/posting module 238 for receiving image files of actual loan applications so further review may be conducted if a reconstruction or verification result indicates potential non-compliance.

These received data are provided to the mortgage modeling module 150, which in one embodiment includes a product, pricing and eligibility (PPE) verification and reconstruction module 240 and a test module 242 with standard and customized tests that can be performed on the incoming data from the lending organizations 210. Listings of tests are further described in the section entitled "Standard and Customized Tests for Regulators and/or Attorneys" below. The PPE verification and reconstruction module 240 is configured in one embodiment to analyze the incoming data and reconstruct estimated pricing using the reconstruction process as described above. In one embodiment, the mortgage modeling module 150 compares the incoming data with standard pricing obtained from the standards database 286, which may include national pricing data 246 and national closing data 248. The comparison with national pricing data 246 and closing data 248 enables the mortgage modeling module 150 to gauge whether the product, pricing and eligibility data points in the incoming data are in line with national averages. The national pricing data 246 and closing data 248 may also be used in the reconstructed process performed by PPE verification and reconstruction module 240. In one embodiment, the comparison and reconstruction can use a subset of the national data, so that incoming data can be compared or reconstructed with pricing and closing data of similarly situated loans (e.g. loans from the same ZIP code).

The mortgage modeling module 150 may also output reports 244 based on two levels of processing—at the loan level and at the batch level. The reports are provided in one embodiment to the result reporting module 166, and include results of the reconstruction/comparison/detection processes, the results of performing tests 242, and/or the calculated percentages of detected non-compliance. In one embodiment, the result reporting module 166 also provides reports 250, score cards 252, summary analysis 254, and specific purpose reports 256 to a requesting entity.

Patterns and Practices and Scorecards

Besides outputting results to the result reporting module 166, the mortgage modeling module 150 may also provide results to the historical transaction data bank 288. The data bank collects and stores these results output by the mortgage modeling module 150 and performs additional trending and pattern matching analyses on the stored results. For example, the data bank 288 may provide scorecards 264 detailing the overall performance of a particular lending organization, which may include analysis of reconstructed data from the mortgage modeling module 150 over, for example, a month-long period. In other embodiments, the scorecards may be generated daily, weekly, or at other frequency. Besides periodic reporting through the scorecards, as an additional example, the data bank 288 may also apply pattern and practice analyses 266 to the reconstructed data received from the mortgage modeling module 150. The pattern and practice analyses may be configured to detect issues such as redlining and steering, which may be difficult to detect on a transaction-by-transaction analysis. The pattern and practice analyses may also compare patterns of activity of comparable lenders, e.g., lenders of similar size, regional focus, market segment, etc. The pattern and practice analysis 266 may be applied at the individual or branch level, so that the patterns and practices of a particular loan officer or branch within a lending organization may be benchmarked against other loan officers or branches. This enables any reviewer (e.g. regulators, civil attorneys, internal auditors) to determine if any individual is engaging in potential violations. In other embodiments, the pattern and practice analysis 266 may set forth industry standards so the afore-mentioned scorecards may include pattern and practice information (e.g. how the patterns and practices of a particular lending organization measure up to the industry-standard patterns and practices).

In addition, a particular loan officer, branch, or lending organization may be compared with a similarly situated counterpart. For example, a report/scorecard may be generated for a lender "A," which has a $500 million annual lending volume and is located in Richmond, Va. The compliance monitoring system 130 may compare the transactions of lender "A" to a lender "B" that has a comparable size of annual business and is also located in Richmond. The denial rate of lender "A" may then be compared to that of lender "B" to determine if lender "A" is engaging in any discriminatory practices. For example, the compliance monitoring system 130 may issue a warning if lender A's denial rate to members of a certain protected class (e.g. race, gender, religion, etc.) is higher than that of lender B by a certain difference threshold (e.g. 10, 20, or 25%). The difference threshold is configurable in one embodiment and may be pre-set by users of the compliance monitoring system 130 (e.g. regulators, private attorneys) in accordance to their needs. Similarly, redlining may be detected by determining if a particular lender's denial rate for a particular area (e.g. ZIP code) is substantially higher than that of a comparable lender. In addition, in other embodiments, the scorecards for Lender A may be compared to the scorecards of Lender B so the overall practice of Lender A may be reviewed in total.

If no comparable lender is located in the local operating area of lender "A," the compliance monitoring system 130 may select another lender from another location with similar population demographic as based on, for example, census data. In other embodiments, the averages of similar situated lending organizations may be compared to the transaction/result/scorecard of a particular lending organization in question. In one embodiment, the scorecards 264 and/or pattern and practice analysis 266 may be provided to the result reporting module 166 for reporting.

The historical transaction data bank 288 in one embodiment also includes other type of data collection and analysis modules for specific purposes such as for regulator reporting 268, attorney reporting 270, and audit/verification 272. Since each type of audience or review purpose has different desired information and analysis, these modules provide customized types of reports. For example, a regulator may wish to review data from lending organizations within a particular jurisdiction, while a civil litigation attorney may be allowed to review data for a particular lending organization as outlined under a discovery request. An internal auditor of a lending organization may likewise review data for a particular lending organization, but may be provided access to additional detailed analysis such as patterns and practices for individual loan officers and branches. In one embodiment, these reports are provided as specific purpose reports 256 in the result reporting module 166.

Sample Compliance Reporting

FIGS. 5A-5E illustrate sample reporting outputs provided by the compliance monitoring system in accordance with one embodiment. As used herein in various embodiments, a number of specific terms are defined in the reports as follows:

Applicant—recorded loan application

Borrower—closed loan

Price—rate, original points, discount points combination

Fees—other origination charges included in the prices i.e. loan processing

Third party charges—required services (e.g. appraisal, title, etc.) Although the origination charges have no tolerances on the dollar value under the RESPA, the third party charges have a 10% tolerance when the lender arranges any third party provider or if the lender provides a menu of providers from which the consumer can select. Only if the consumer independently chooses a provider will the lender not be held to the tolerances.

Changed Circumstances Reporting

FIG. 5A illustrates an example RESPA changed circumstances detection performed by the compliance monitoring system 130. In one embodiment the reporting module 290 of the compliance monitoring system 130 is configured to issue these reports on a periodic basis or in response to a specific request. FIG. 5A shows a report 420 that in one embodiment provides a detailed view of the individual loans that were processed by the compliance monitoring system 130. In one embodiment, the report 420 comprises a loan information section 422, a quote before changed circumstances section 424, a price at closing section 426, and a price increase information section 428. The quote before changed circumstances section 424 may further include an actual quote section 430 and a reconstructed quote section 432. The reconstructed quote section 432 may display the reconstructed loan terms calculated by the compliance monitoring system 130. The same terms may also be displayed in the price at the closing section 426, as shown, along with an actual price at closing section 434. With the actual quote before the changed circumstances and price at closing displayed alongside of the reconstructed data, a reviewer may be able to quickly determine if a violation of RESPA had occurred. To further aid the reviewer, the price increase information section 428 displays the calculated differences in prices (if any) between the price at closing and the price quoted before the changed circumstances. Other loan information such as loan types, product codes, relevant dates, the presence or absence of changed circumstances are displayed in the loan information section 422 for quick reference as well.

Good Faith Estimate Versus Lock Versus Closing Price Compliance Reporting

FIG. 5B shows another example report 520 provided by the compliance monitoring system 130 that focuses on the detection of changes in pricing terms among those provided by GFE, those set at time of locking, and those used at closing. As with the report shown in FIG. 4, the report 520 comprises a loan information section 522, a GFE terms section 524, a locked terms section 526, a terms at closing section 528, and a price increase information section 530. The terms are displayed for each loan so a reviewer can quickly determine changes among the terms provided at three points in time during the loan process: at the issuance of the GFE, at the point of locking, and at the point of closing. The calculated changes, if any, are automatically displayed in the price increase information section 530.

Pricing Disparity Reporting

FIG. 5C provides another example report 620 output by the compliance monitoring system 130 that focuses on the detection of pricing disparity. As with the report shown in FIG. 5A, the report 620 comprises a loan information section 622, an actual terms section 624, a calculated terms section 626, and an overage section 628, and a loan fee/loan amount ratio section 630. The loan information 622 provides additional details concerning the disposition of each loan application reviewed by the compliance monitoring system 130. In the example shown, the loan type, the relevant dates (locked vs. closed), the disposition of the application, the loan purpose, and the loan amount are displayed in the report 620. In one embodiment, the actual terms are shown (in section 624) alongside of calculated loan terms (in section 626) reconstructed by the compliance monitoring system 130 in the manner as described above. The overage section 628 shows the difference between the calculated and actual terms, as the focus of the report is on identifying pricing disparity. The loan fee/loan amount ratio section 630 provides a percentage of loan fees to loan amount calculated by the compliance monitoring system 130.

Loan Denial Reporting

Figure 5D:
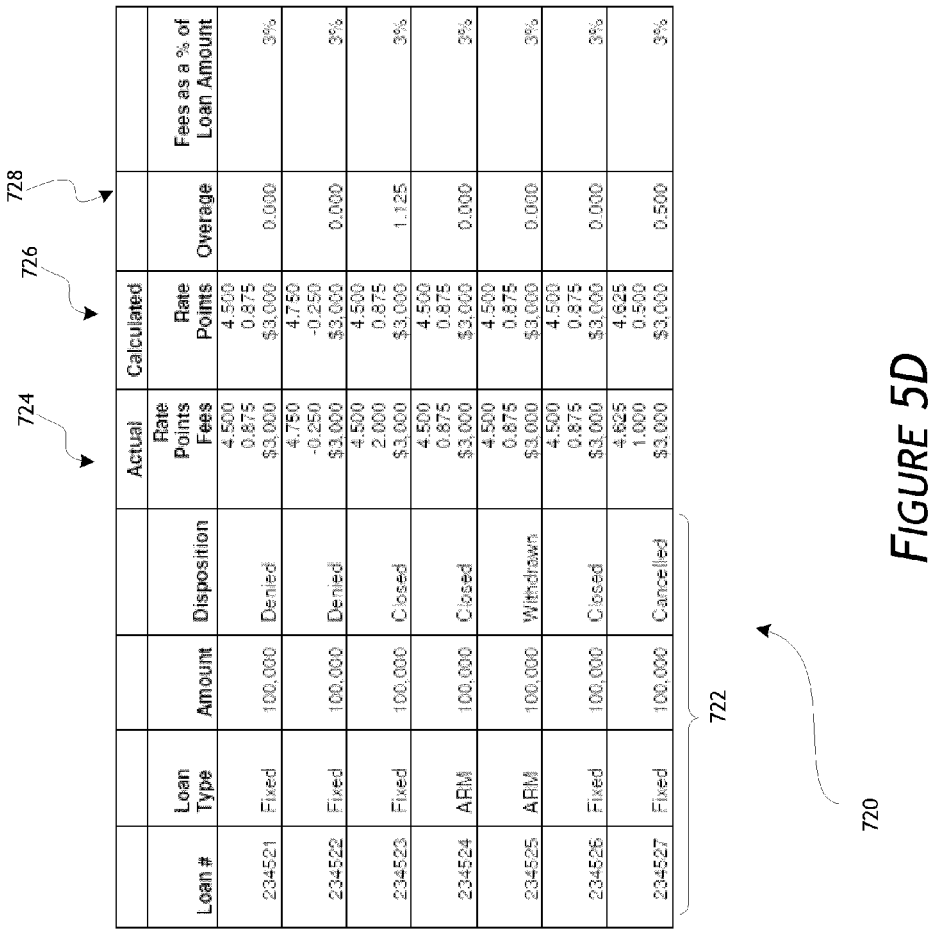

FIG. 5D provides another example report 720 output by the compliance monitoring system 130 that focuses on the detection of potentially illegal loan denials. As with the report shown in FIG. 5A, the report 720 comprises a loan information section 722, an actual terms section 724, a calculated terms section 726, and an overage section 728. The loan information 722 provides additional details concerning the disposition of each loan application reviewed by the compliance monitoring system 130. In the example shown, the loan type, the relevant dates (locked vs. closed), the disposition of the application, the loan purpose, and the loan amount are displayed in the report 720. In one embodiment, the actual terms are shown (in section 724) along side of calculated loan terms (in section 726) reconstructed by the compliance monitoring system 130 in the manner as described above. The overage section 728 shows the difference (increase) between the actual and the calculated terms.

Redlining Reporting

FIG. 5E provides another example report 820 output by the compliance monitoring system 130 that focuses on the detection of redlining. As with the report shown in FIG. 5D, the report 820 comprises a loan information section 822, a demographic information section 824, an applicant financial information section 826, an actual terms section 828, a calculated terms section 830, an overage section 832, and a fee over loan ratio section 834. The loan information 822 provides additional details concerning the disposition of each loan application reviewed by the compliance monitoring system 130. In the example shown, the loan type, the relevant dates (locked vs. closed), the disposition of the application, the loan purpose, and the loan amount are displayed in the report 820. In one embodiment, the demographic information section 824 displays the ZIP code and the census tract of the subject property, and the applicant financial information section 826 displays the FICO score, the Loan to Value (LTV), and the Combined Loan to Value (CLTV). These information help a reviewer determine whether "redlining" is occurring within the loan applications uploaded by the particular lender for which the report 820 is issued. Finally, the details section in one embodiment includes the overage section 832, which shows the difference between the calculated and actual terms, and the loan fee/loan amount ratio section 834, which provides the percentage of loan fees to loan amount as calculated by the compliance monitoring system 130. In one embodiment, the actual terms are shown (in section 828) alongside of calculated loan terms (in section 830) reconstructed by the compliance monitoring system 130 in the manner as described above.

Regulation Z Compliance Reporting

In one embodiment, the compliance monitoring system 130 is configured to detect whether a lending organization has likely complied with "Regulation Z" rules related to adverse credit report disclosure. The rules require lenders to provide "risk-based pricing notices" regarding any adverse credit information in a loan applicant's file that affects the pricing that the applicant receives. For example, under the regulations, a lender must provide an adverse notice to a loan applicant who has a lower than expected credit score that resulted in a change in the loan pricing. In one embodiment, the compliance monitoring system 130 determines, as part of the loan reconstruction process, whether a loan applicant should have received such a notice, and if so, whether the notice was actually sent to the loan applicant. As discussed above, the compliance monitoring system 130 in one embodiment also determines a risk-based pricing during the reconstruction process and compares it to the pricing actually received by the loan applicant. This provides another layer of compliance verification to assist regulators and/or other interested parties (e.g. private attorneys) in detecting non-compliance and protecting consumers.

Standard and Customized Tests for Regulators and/or Attorneys

In one embodiment, the compliance monitoring system 130 is configured to also detect various types of violations based on customized input. For example, an attorney or regulator may input and/or select a set of laws and regulations related to lending, and request the compliance monitoring system 130 to determine whether potential violations of such laws and regulations occurred within a specific input data set from one or more lending organizations. In one embodiment, the compliance monitoring system 130 is configured to perform a number of standardized tests (as shown in element 242 of FIG. 4D) that are configurable by users. The results of the tests include the execution of loan reconstruction analysis on the received loan data and/or a comparison of the results to specified criteria and metrics defined by the tests. The results may also be provided to the users via the reporting module 166 as shown in FIG. 4D. The tests may include:

1. Loan Denials: Reconstruct loan scenario and loan terms offered for that exact timeline. Based upon the lender's documented risk based pricing and underwriting guidelines, provide product, pricing and eligibility results to determine borrower's qualifications. Trend analysis, based on the historical transactions stored in data bank 288, may also be used to determine numbers, percentages and patterns of protected borrower classes being unfairly denied credit.

2. Borrower Down-Streaming: Trend analysis test to see whether the lender provided the best available loan products and loan terms to all similarly situated borrowers. The trend analysis may be based on recorded transactions stored in the data bank 288.

3. Unequal Borrower Pricing: Trend analysis test to determine whether all similarly situated borrowers with the same financial facts received the same loan pricing (ZIP code, race, ethnicity, color, national origin, sex, and familial status). The trend analysis may be based on recorded transactions stored in the data bank 288. In another embodiment, the analysis includes a comparison with results and transactions from similarly situated lenders or industry standards.

4. Trend Analysis Testing: Ten RESPA tests (see list below) or any other list of customized data capture points to be contrasted and compared to determine trends of unfair or unequal lending. The trend analysis may be based on recorded transactions stored in the data bank 288. In another embodiment, the analysis includes a comparison with results and transactions from similarly situated lenders or industry standards.

In one embodiment, the compliance monitoring system 130 is further configured to perform one of more of the following tests related to RESPA, as listed below:

1. Reissue GFE Disclosure Due to Changed Circumstances: Where an originator claimed one of the four changed circumstances (Acts of God, inaccurate information, new information, other circumstances) caused the loan terms to change, map and code the list of changed circumstances. Map the lender's daily underwriting rules and risk based pricing to each loan program. With the exception of Acts of God, test and red flag report whether borrower could have still qualified based upon the changed circumstances (similar to accident reconstruction). Report percentages of pass/fail and degree of failed files (e.g. via reporting module 166).

2. Disclosure Timelines: Test whether the required disclosures and required re-disclosures were provided to the applicant by the statutory date requirements (e.g. GFE within 3 days of application information, application denial within 3 business days of receipt of application information, GFE 10 day expiration date, reissue of GFE within 3 days of "changed circumstances," rate lock dates, and new construction re-disclosure dates).

3. Tolerance Testing: Test whether the origination charges listed on the last GFE match exactly to the origination charges on the HUD 1 (at closing) with no tolerances. Test whether the settlement services charges were provided by the lender or provided through a lender menu of providers to the borrower. If so, test whether the tolerances on the HUD 1 were within a threshold of 10% or less of the settlement charges provided on the GFE.

4. Accurate Representations of Available Loan Programs and Pricing: Document that mortgage broker offered a readily available loan product and current pricing from the named wholesale lender. Document "acceptance date" of loan file from mortgage broker to lender. Test whether the lender honored the loan offered by the mortgage broker to the borrower after the loan file was accepted. If the lender did not accept the loan file from the mortgage broker, investigate the reason for non-acceptance and determine how long it took to deny the acceptance of the application.

5. Rate Guarantee and Closing Cost Timelines for Brokered Loans: Document the interest rate guarantee date and time period from mortgage broker to borrower. Document rate lock date and rate lock time period between mortgage broker and lender for that specific borrower. Test whether all of the dates match at exactly or overlap to the consumer's benefit. Test whether the same loan and pricing that was represented to the borrower were actually provided to the borrower.

6. Accurate GFE Mapping: Test whether all of the GFE charges on the properly map to the charges on the HUD 1.

7. Aggregate Pricing Calculations: Using the stored historical transaction data, load and calculate that the settlement services were properly calculated based upon lender's claimed timelines, etc. when using "average pricing". When aggregate pricing excesses occurred during specified timelines of average pricing, did the lender roll the aggregate excess to the new timeline, providing the aggregate discount to the new group of borrowers?

8. Curing Scorecard: Test and/or report whether the lender cure tolerance violations within the 30 day statutory timeline. Report in numbers and percentages of total files.

9. Crediting Rebates and Yield Spreads: Test whether the mortgage broker yield spreads and rebates were properly credited on the HUD 1 for the borrower. Test whether credits on the HUD 1 match the final GFE with no tolerances.

10. Miscellaneous Tests: Other customization testing as required regulators, investigators, attorneys, and/or other interested parties.

In one embodiment, the compliance monitoring system 130 is further configured to perform one of more of the following tests related to regulations or conduct under the Federal Trade Commission (FTC)'s jurisdiction.

1. Deceptive Advertising Representations: Test whether a lender or mortgage broker is accurate in its representations that its loan terms and/or settlement costs are: lowest, best, fair, low-cost, etc. Comparatively test the subject company against a comprehensive set of stored retail price information. This may include the average loan rate/fee combination pricing by ZIP code (e.g., six month look back) and the average settlement costs (may look back by specific time periods, longer than 6 months) including third party settlement costs at state level average pricing.

2. Deceptive Loan Origination Representations: Where a lender or mortgage broker claimed one of the four changed circumstances under RESPA (Acts of God, inaccurate information, new information, other circumstances) caused the loan terms to change, map and code the list of changed circumstances. Map the lender's daily underwriting rules and risk based pricing to each loan program. With the exception of Acts of God, test and red flag report whether borrower could have still qualified based upon the changed circumstances. Report percentages of pass/fail and degree of failed files.

3. Deceptive Loan Origination Practices Regarding GFE, Internal Rate Lock, and Final HUD 1: Test whether the internal rate lock was consistent with the GFE and whether both were consistent with the HUD 1. Load all data points and test against for discrepancies in rate/fee combinations.

4. Tolerance Testing for Higher Priced Loans: Test whether the lender or mortgage broker on an APR defined high-cost loan (1) considered the borrower's ability to repay beyond the collateral itself; (2) verified income and assets that were used to determine the borrower's ability to repay; (3) prohibited prepayment penalties under most circumstances; and (4) required escrowed taxes and insurance.

5. Test Lenders and Mortgage Brokers for Representations of Loan Programs, Pricing and Equal Credit Opportunity Act (ECOA) Compliance: Document that lender and/or mortgage broker offered a readily available loan product and current pricing from the named wholesale lender. Document "acceptance date" of loan file from mortgage broker to lender. Test whether the lender honored the loan offered by the mortgage broker to the borrower after the loan file was accepted. If the lender did not accept the loan file from the mortgage broker, investigate the reason and how long did it take to deny acceptance of the application. Test whether the proper ECOA denial documents were provided to applicant as required by law.

6. Test for Deceptive Loan Origination Tactics About Rate Guarantee and Closing Cost Timelines For Brokered Loans: Document the interest rate guarantee date and time period from mortgage broker to borrower. Document rate lock date and rate lock time period between mortgage broker and lender for that specific borrower. Determine whether all of the dates match at exactly or overlap to the consumer's benefit. Test if the same loan and pricing that was represented to the borrower was actually provided to the borrower.

7. Accurate TIL Disclosure Testing: Test whether the TIL charges provided to the borrower were accurate in respect to the lender's posted pricing for that day and the issued GFE.

8. Test For Pricing Availability Per Advertisements and that Pricing Being Offered to Qualified Borrowers: Using the stored historical transaction data, load and calculate that lender pricing and settlement services, including third party settlement services pricing to determine if those prices were actually available and offered to the consumer at the timeline under review.

9. Deceptive Practices Testing for Correcting Tolerances: Test whether the lender cure tolerance violations within the 30 day statutory timeline. Report in numbers and percentages of total files were cures required and completed.

10. Accurately Crediting Rebates and Yield spreads: Test whether the mortgage broker yield spreads and rebates were properly credited on the HUD 1 for the borrower. Test whether the credits on the HUD 1 match the final GFE with no tolerances.

11. Miscellaneous: Other customization testing as required. Trend analysis tests may also be performed to determine the extent of the violations. In another embodiment, the analysis includes a comparison with results and transactions from similarly situated lenders or industry standards.

CONCLUSION

All of the methods and processes described above may be embodied in, and fully automated via, software code modules executed by one or more general purpose computers or processors. The code modules may be stored in any type of computer-readable medium or other computer storage device. Some or all of the methods may alternatively be embodied in specialized computer hardware. In addition, the components referred to herein may be implemented in hardware, software, firmware, or a combination thereof.

All of the methods described herein may be performed and fully automated by a computer system. The computer system may, in some cases, be composed by multiple distinct computers or computing devices (e.g., physical servers, workstations, storage arrays, etc) that communicate and interoperate over a network to perform the described functions. Each such computing device typically includes a processor (or multiple processors) that executes program instructions stored in a memory. The results of the disclosed methods may be persistently stored by transforming physical storage devices, such as solid state memory chips and/or magnetic disks, into a different state.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure.

Although the foregoing invention has been described in terms of certain embodiments, other embodiments will be apparent to those of ordinary skill in the art from the disclosure herein. Moreover, the described embodiments have been presented by way of example only, and are not intended to limit the scope of the inventions. Indeed, the novel methods and systems described herein may be embodied in a variety of other forms without departing from the spirit thereof. Accordingly, other combinations, omissions, substitutions and modifications will be apparent to the skilled artisan in view of the disclosure herein. For purposes of discussing the invention, certain aspects, advantages and novel features of the invention have been described herein. Of course, it is to be understood that not necessarily all such aspects, advantages or features will be embodied in any particular embodiment of the invention.

What is claimed is:

1. A system for assessing lender performance, comprising:
a computer system that comprises at least one computer processor;
a computer data repository that stores loan data for each of a plurality of mortgage loans provided by a lender to borrowers, said loan data including borrower data and including actual loan term data that specifies actual loan terms, including actual pricing terms, offered to the respective borrowers; and
a performance assessment module configured to be executed by the computer system, the performance assessment module configured to cause the computer system to assess lender performance by at least:
generating, using a risk-based pricing model, reconstructed loan terms, including reconstructed pricing terms, for each of the plurality of loans, said reconstructed loan terms reflecting eligibilities of borrowers, said risk based-pricing model reflecting historical correlations between borrower attributes and loan defaults;
for each of said loans, comparing the reconstructed loan terms to the corresponding actual loan terms, and generating a loan performance measure based on the comparison; and
determining, based on the loan compliance measures for the plurality of loans, a lender performance measure reflective of how frequently the lender fails to offer borrowers the most favorable loan terms for which they qualify.

2. The system of claim 1, wherein the performance assessment module is additionally configured to cause the computer system to:
detect that the terms of a loan at closing were less favorable than the terms specified in a corresponding good faith estimate (GFE); and determine whether less favorable terms are justified by a changed circumstances designation.

3. The system of claim 2, wherein the performance assessment module is additionally configured to cause the computer system to determine whether a price increase associated with the changed circumstances designation exceeds a permissible price increase.

4. The system of claim 1, wherein the performance assessment module is additionally configured to cause the computer system to determine whether a correlation exists between (1) borrower attributes associated with protected class status, and (2) the lender's failure to provide the most favorable loan terms.

5. The system of claim 1, wherein the performance assessment module is additionally configured to cause the computer system to determine whether a correlation exists between (1) the lender's failure to provide the most favorable loan terms, (2) and particular geographic areas associated with the loans.

6. The system of claim 1, wherein the performance assessment module is additionally configured to cause the computer system to use the loan compliance measures to perform a branch-level benchmarking analysis in which a particular branch of the lender is benchmarked against other branches of the lender.

7. The system of claim 1, wherein the performance assessment module is additionally configured to cause the computer system to use the loan compliance measures to perform a loan officer level benchmarking analysis in which a particular loan officer of the lender is benchmarked against other loan officers of the lender.

8. The system of claim 1, wherein the performance assessment module is additionally configured to cause the computer system to generate, for a loan, a report that indicates the reconstructed loan terms for the loan, the actual loan terms for the loan, and an overage amount representing a difference between the reconstructed and actual loan terms for the loan.

9. A system for assessing lender performance, comprising:
a computer system that comprises at least one computer processor;
a computer data repository that stores loan data for each of a plurality of mortgage loans provided by a lender to borrowers, said loan data including borrower data and including actual loan term data that specifies actual loan terms, including actual pricing terms, offered to the respective borrowers; and a performance assessment module configured to be executed by the computer system, the performance assessment module configured to cause the computer system to assess lender performance by at least:
determining, for each loan, whether closing terms of the loan are less favorable than the terms specified in a corresponding good faith estimate (GFE);
determining, for each loan for which the closing terms are less favorable than the GFE terms, whether less favorable terms are justified by a changed circumstances designation provided by the lender; and
generating a performance measure for the lender based at least partly on how frequently the lender's changed circumstances designations fail to justify the less favorable terms.

10. The system of claim 9, wherein the performance measure includes a percentage value indicating a percentage of loans for which the lender's changed circumstances designations fail to justify the less favorable terms.

11. The system of claim 10, wherein the performance measure additionally includes a total dollar amount associated with unjustified price increases.

12. The system of claim 9, wherein the performance assessment module is additionally configured to cause the computer system to determine whether a loan price increase occurring between a GFE and closing represents an overage beyond risk-based pricing used by the lender.

13. The system of claim 9, wherein the performance assessment module is additionally configured to cause the computer system to determine whether a correlation exists between (1) borrower attributes associated with protected class status and (2) loan term changes that are not justified by changed circumstances designations.

14. The system of claim 9, wherein the performance assessment module is additionally configured to cause the computer system to use the loan compliance measures to perform a branch-level benchmarking analysis in which a particular branch of the lender is benchmarked against other branches of the lender.

15. The system of claim 9, wherein the performance assessment module is additionally configured to cause the computer system to use the loan compliance measures to perform a loan officer level benchmarking analysis in which a particular loan officer of the lender is benchmarked against other loan officers of the lender.

* * * * *